United States Patent
Grolla et al.

(10) Patent No.: US 8,062,021 B2
(45) Date of Patent: Nov. 22, 2011

(54) ACTUATOR FOR DEEP-DRAW THERMOSHAPING MACHINE

(75) Inventors: Peter Grolla, Luebeck (DE); Frank-Michael Woelk, Reinfeld (DE)

(73) Assignee: Gabler Thermoform GmbH & Co. KG, Luebeck (DE)

(*) Notice: Subject to any disclaimer, the term of this patent is extended or adjusted under 35 U.S.C. 154(b) by 154 days.

(21) Appl. No.: 12/689,026

(22) Filed: Jan. 18, 2010

(65) Prior Publication Data

US 2010/0183758 A1 Jul. 22, 2010

(30) Foreign Application Priority Data

Jan. 19, 2009 (DE) .................. 10 2009 005 406
Dec. 18, 2009 (DE) .................. 10 2009 059 068

(51) Int. Cl.
*B29C 51/44* (2006.01)
(52) U.S. Cl. ............... 425/317; 425/398; 464/71
(58) Field of Classification Search ............ 425/317, 425/398; 403/220–228; 464/71, 72
See application file for complete search history.

(56) References Cited

U.S. PATENT DOCUMENTS

| | | | |
|---|---|---|---|
| 6,508,713 B1* | 1/2003 | Kaye | 464/71 |
| 7,332,121 B2* | 2/2008 | Schlosser et al. | 425/398 |
| 7,458,865 B2* | 12/2008 | Araki | 464/72 |
| 7,560,063 B2* | 7/2009 | Schlosser et al. | 425/398 |

FOREIGN PATENT DOCUMENTS

| | | |
|---|---|---|
| DE | 9108344 | 10/1991 |
| DE | 4033534 | 4/1992 |

* cited by examiner

*Primary Examiner* — Robert B Davis
*Assistant Examiner* — Thukhanh Nguyen
(74) *Attorney, Agent, or Firm* — Andrew Wilford

(57) ABSTRACT

A thermoshaping machine has a movable die operated by a linkage and an actuator having a transmission fixed on the machine, operatively connected to the linkage, and having a transmission flange. A motor has a motor flange spaced along an axis from the transmission flange. The flanges are each formed centered on the axis with a respective circular array of holes, and each hole of the transmission flange is aligned axially with a respective hole of the transmission flange. Respective guide rods have outer ends fixed in the holes of one of the flanges and inner ends extending axially through the holes of the other flange. Respective elastically compressible biasing elements are braced axially between each of the inner ends and the other flange.

13 Claims, 2 Drawing Sheets

ACTUATOR FOR DEEP-DRAW THERMOSHAPING MACHINE

FIELD OF THE INVENTION

The present invention relates to deep-draw thermoshaping. More particularly this invention concerns an actuator for a deep-draw thermoshaping press or machine.

BACKGROUND OF THE INVENTION

It is known to form, for example, cups and lids from a thermoplastic film in a die assembly having a lower die formed with an array of pockets conforming to the outside surface of the workpieces to be made and an upper die that fits with the lower die and that has, in additional to optional plugs fittable into the pockets, nozzles that apply pressurized air to the top of the film above each pocket to deform it downward into the pockets. The two dies, which are normally heated to soften the film, are first moved vertically together to grip the film around each pocket and are pressed vertically together with considerable force while air is admitted and the film is deformed. Once the deformation is completed, the upper die is retracted upward and the lower die is tilted about a horizontal axis to hoop-cut the individual workpieces out of the film and discharge them from the press. The empty lower die is then returned to an upwardly open starting position, a new section of the film is advanced in a horizontal travel direction into position between it and the upper die, and another cycle can be started.

The relative vertical movement of the dies, or at least the vertical movement and tilting of the lower die (the terms "upper" and "lower" being purely relative and nonlimiting), is effected by an actuator or drive assembly comprising an electric motor, especially a servomotor, that is coupled by a transmission with the lower die. This drive motor has a flange coupled to a flange of the transmission, with a circular array of bolts or tie rods interconnecting the two flanges.

Such an actuators also has an intermediate coupling as an additional construction part, with an adapter bell between the electric motor and the transmission that houses the coupling and simultaneously is formed with the flange. In DE 91 08 344.3 an electric motor used as a drive configured with speed-reduction gears and a coupling on which the mold or swivel table of the lower die engages. As a rule, a servomotor is used, as is known from DE 40 33 534. It performs the pivoting by means of a crank motion or a spindle drive, while axial motion is done by means of a cam disk that is moved by a toggle linkage.

During the cutting out of the shaped workpieces from the film, strong impacts and vibrations occur in the actuator moving the dies toward each other. These act upon the drive system, primarily the electrical servomotor that actuates a cam-disk toggle linkage via a downstream transmission, at the end of which the mold table with the die that is mounted on it is mounted, and can cause damage to the motor parts, as well as to its control.

OBJECTS OF THE INVENTION

It is therefore an object of the present invention to provide an improved actuator for a deep-draw molding machine.

Another object is the provision of such an improved actuator for a deep-draw molding machine that overcomes the above-given disadvantages, in particular wherein harmful effects to the drive system are decreased and the operating mode of the thermoshaping machine is improved.

SUMMARY OF THE INVENTION

A thermoshaping machine has a movable die operated by a linkage and an actuator having according to the invention a transmission fixed on the machine, operatively connected to the linkage, and having a transmission flange. A motor has a motor flange spaced along an axis from the transmission flange. The flanges are each formed centered on the axis with a respective circular array of holes, and each hole of the transmission flange is aligned axially with a respective hole of the transmission flange. Respective guide rods have outer ends fixed in the holes of one of the flanges and inner ends extending axially through the holes of the other flange. Respective elastically compressible biasing elements are braced axially between each of the inner ends and the other flange.

This problem is thus solved in accordance with the invention in that the flange on the side of the motor and the flange on the side of the transmission are axially relatively displaceable relative to each other and are designed with integrated compression elements. Since the electric motor and the transmission are no longer connected rigidly with each other by the flange and guide rods, but are instead displaceable against each another in accordance with the invention, the electric motor can be decoupled from the downstream drive parts in relation to the vibrations, because the ability to displace creates the prerequisite for loading the integrated compression elements in such a way that horizontal impact and vibrations can be reduced.

According to a preferred embodiment of the invention the flange on the motor side is cup-shaped with a sleeve or side wall provided with bores, and the guide rods project out of the bores with their inner ends that are remote from the transmission flange, the projecting inner ends are enclosed by a compression element that loads the biasing element located on the one hand between the sleeve and the compression element, as well as on the other hand, between the sleeve and the transmission flange. The electric motor assembly can be slid with its flanges onto the guide rods fixed on the transmission flange for simple mounting, as well as removal for replacement or servicing. When the compression elements are mounted on the projecting inner ends of the guide rods, the biasing element can be compressed as needed. In an intermediate adapter bell forming a housing for a coupling, the adapter bell can be divided immediately and the flange on the motor side can be shaped as described.

The biasing elements are designed as a first and a second elastic O-ring. These absorb the horizontal impacts and vibrations, the consistency of their material, for example, the Shore hardness, allowing adaptation to the vibration properties. When the compression element advantageously consists of several parts and is made up of a washer and an intermediate ring or cylindrical wall whose bores receive receiving the guide rods is whose outer end bears on the inner biasing element in turn bearing on the motor flange, in the compression element, preferably designed as a combination of a screw with completely encloses the inner ends of the guide rods and thus provides shock dampening mounting of the electric motor. Because the screws are anchored in the guide rods, the desired prestressing is applied with the nuts, and position can be locked in.

According to one embodiment of the invention, the washer and the intermediate ring are rigid and made of steel so that only the compression element or the prestressing of the O-rings produces the horizontal damping.

A further preferred embodiment of the invention provides that the bores in the sleeve of the flange on the motor side are larger than the diameters of the guide rods and in the intermediate space, radial vibration-damping friction bearings are located. Hereby, an advantageous embodiment of the invention provides that the friction bearings are sleeves and each have a radial rim. The radial rims extend concentric to the biasing element and project radially outward past the bores of the sleeve on the motor side or the transmission side from the outside. In combination with the O-rings, it can thus be achieved that the flanges are neither axially nor radially rigidly fixated, and the friction bearings, particularly of plastic, decrease radial impacts and vibrations in amplitude and acceleration between the transmission and the electric motor. Because of the concentric installation of compression element onto the radial rim of the friction bearings, reciprocal shock damping is promoted. According to an advantageous proposal of the invention, the friction bearing on the side of the motor is mounted with an axial space between the compression element and its radial rim. This small gap makes it possible that the compression element first only acts upon the inner biasing element, before abutting the radial rim of the inner friction bearings or sleeve.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
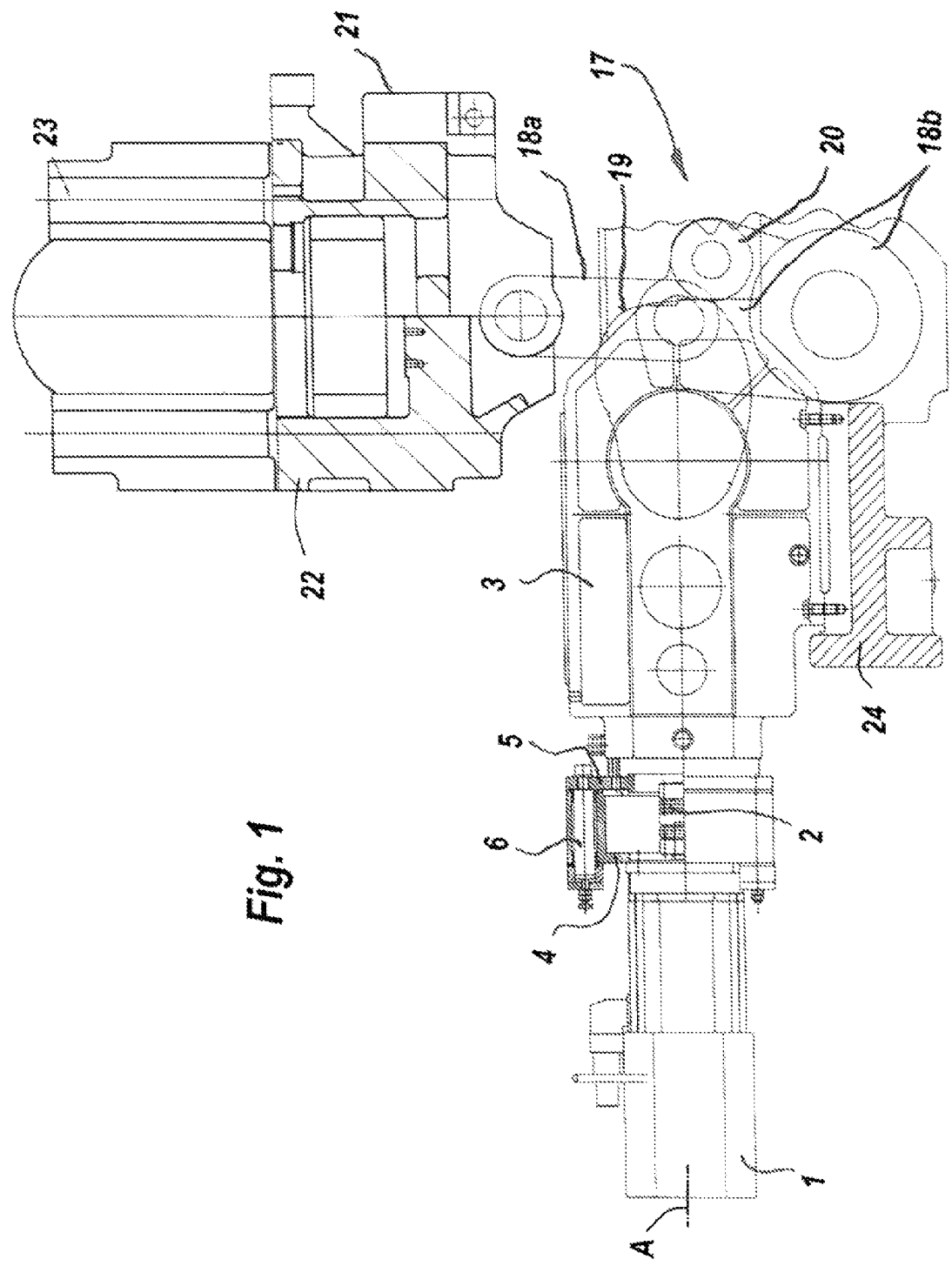
FIG. 1 is a partly sectional side view of a portion of a deep-draw thermoshaping machine and its actuator.

As seen in FIG. 1 an actuator of a thermoshaping machine not shown in its entirety is provided with an electric servomotor 1 connected to a transmission 3 by a torque-transmitting coupling 2. This actuator operates an assembly 17 carrying a support 21 for a lower die 22 engageable with an upper-die assembly 23 and both vertically shifts the support 21 and die 22 and also pivots them relative to a stationary machine base 24 to form and cut out workpieces and eject them into a stack or conveyor tube. Here, the drive assembly 17 is a cam and toggle linkage having an upper knee lever or link 18a pivoted on a lower knee lever or link 18b, a cam disk 19, and a cam roller 20 that works together. The vertical mold-closing and -opening movement and the pivoting/cutting/ejecting movements are shown clearly in the above-cited German references.

Figure 2:
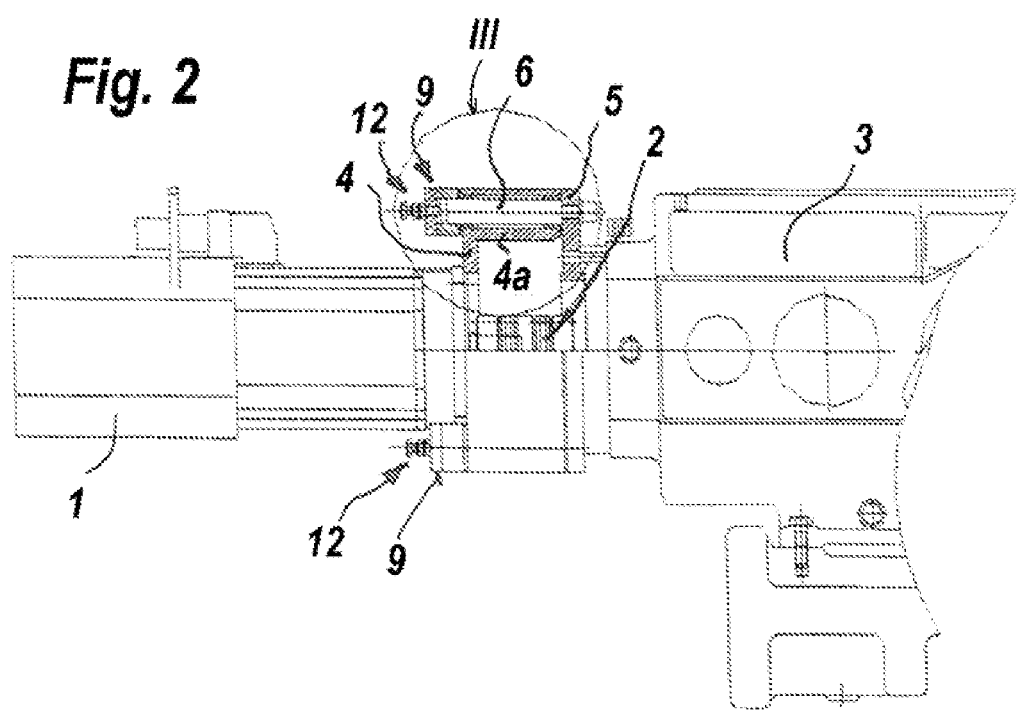
FIG. 2 is a detail of the actuator.

The electric motor 1 has on its end turned toward the transmission 3 a flange 4 that spacedly confronts a similar flange 5 of this transmission 3, both flanges 4 and 5 being formed as rigid steel rings with parallel planar faces perpendicular to an axis A of the motor 1. The transmission flange 5 carries guide rods 6 centered on parallel axes radially equispaced from and around the axis A. The flange 4 is actually cup-shaped, unitarily formed with a radially thick cylindrical wall 4a centered on the axis A and extending toward the transmission flange 5. This wall 4a is formed with an array of cylindrical bores or passages 7 coaxial with the respective rods 6 but of larger diameter than the cylindrical outer surfaces of these rods 6, so that same are received with significant radial play in the bores 7. Bolts 8 extend through the flange plate 5 and have threaded shanks 11 seated in the outer ends of the rods 6 to lock these rods 6 solidly onto the flange 5 of the transmission 3. The guide rods 6 have inner ends that project inwardly (to the left in FIGS. 1-3) out of the bores 7 of the wall 4a.

Figure 3:
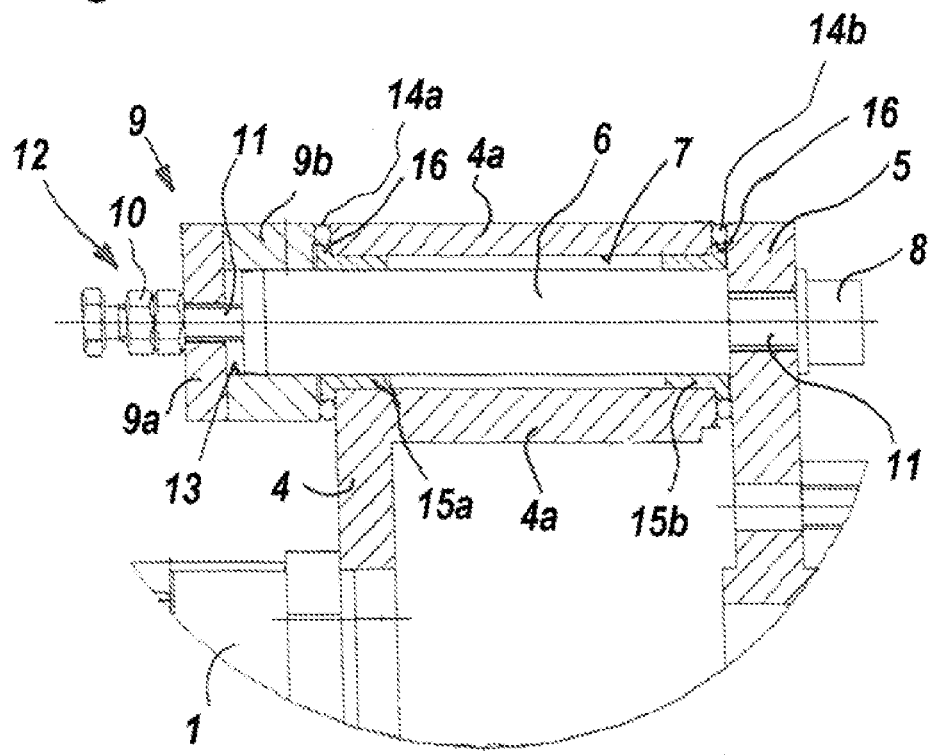
FIG. 3 is a large-scale view of the detail indicated at III in FIG. 2.

As can be seen clearly in FIG. 3, compression elements 9 are mounted on the projecting ends of the guide rods 6. These elements 9 each comprise a rigid steel outer washer 9a through which extends a threaded stud or stem 11 seated in the respective rod 6 and a short cylindrical steel sleeve 9b having a bore 13 snugly surrounding the inner end of the respective rod 6. A respective assembly 12 comprised of lock nuts 10 threaded on the stem 11 allows the element 9 to be biased outward toward the flange 5.

An elastomeric O-ring 14a is engaged around the inner end of each rod 6 and axially between the outer face of each sleeve 9b and the inner face of the flange 4, and another elastomeric O-ring 14b is engaged around the outer end of each rod 6 and axially between the outer end face of the wall 4a and the inner face of the flange 5b. Similarly elastomeric slide sleeves 15a and 15b around the inner and outer ends of each rod 6 radially center the respective rod 6 in the respective bore 7. These sleeves 15a and 15b have radially projecting rims or flanges radially aligned with the respective rings 14a and 14b and also compressed against the flanges 4 and 5. These parts 14a and 14b cushion axial shocks and the parts 15a and 15b cushion radial shocks.

Thus the motor 1 is decoupled from the transmission 3 such that shocks and vibration caused by the rapid cycling of the die are damped somewhat. Furthermore the extent of damping can be adjusted easily and very accurately by tightening or loosening the assembles 12 and thereby changing the compression or prestress in the elastomeric parts 14a, 14b, 15a, 15b, and 16 that support the motor 1 on the transmission 3.

As the result of the decoupling according to the vibrations of the electric motor and downstream drive parts, the transmission of vibrations can be decreased depending on the load from the electric motor to the transmission, as well as in the reverse

We claim:

1. In combination with a thermoshaping machine having a movable die operated by a linkage, an actuator comprising:
   a transmission fixed on the machine, operatively connected to the linkage, and having a transmission flange;
   a motor having a motor flange spaced along an axis from the transmission flange, the flanges each being formed centered on the axis with a respective circular array of holes, each hole of the transmission flange being aligned axially with a respective hole of the transmission flange;
   respective guide rods having outer ends fixed in the holes of one of the flanges and inner ends extending axially through the holes of the other flange; and
   respective elastically compressible biasing elements braced axially between each of the inner ends and the other flange.

2. The combination defined in claim 1, further comprising a coupling extending on the axis between the motor and the transmission.

3. The combination defined in claim 1 wherein both flanges are of metal and the elements hold the flanges out of direct contact with each other and hold the other flange out of direct contact with the rods.

4. The combination defined in claim 1 wherein the motor flange is the other flange and is formed centered on the axis with a sleeve formed with axially extending bores constituting the holes of the other flange and each receiving the respective rod with radial play.

5. The combination defined in claim 4 wherein the motor flange has an inner face turned away from the transmission housing and the transmission flange has an inner face turned toward the motor flange, the biasing elements being inner and outer elastomeric rings respectively bearing outward on the inner faces of the motor flange and transmission flange.

6. The combination defined in claim 5, further comprising respective compression elements carried on the inner ends of the rods and bearing on the inner rings and therethrough on the inner face of the motor flange.

7. The combination defined in claim 6 wherein the compression elements each include:
    a sleeve snugly surrounding the inner end of the respective rod and bearing axially outward on the respective inner ring, and
    a screw assembly seated in the respective rod and having a nut bearing axially outward on the sleeve.

8. The combination defined in claim the 7 wherein each screw assembly includes
    a respective screw fixed in the respective rod and carrying the respective nut.

9. The combination defined in claim 8 wherein each compression element includes
    a rigid washer surrounding the respective screw and braced axially between the respective nut and the respective sleeve.

10. The combination defined in claim 9 wherein the sleeves and washers are of steel.

11. The combination defined in claim 6 wherein the biasing elements further include for each rod an inner sleeve surrounding the rod inner end and bearing radially outward on the other flange and an outer rod surrounding the rod outer end and bearing radially outward on the other flange.

12. The combination defined in claim 11 wherein the outer sleeves each have a radially projecting rim engaged axially between the transmission flange and the other flange and the inner sleeves each have a radially projecting rim engaged axially between the other flange and the respective compression element.

13. The combination defined in claim 12 wherein the inner rim of each inner sleeve is axially spaced from the respective compression element.

* * * * *